United States Patent
Broberg et al.

(10) Patent No.: US 8,589,272 B1
(45) Date of Patent: Nov. 19, 2013

(54) SYSTEM AND METHOD FOR FACILITATING THE AMENDING OF SYNDICATED LOANS

(75) Inventors: Tejs Broberg, Los Angeles, CA (US); Ron Silverton, Beverly Hills, CA (US); Matt Cornue, Los Angeles, CA (US); Brian Bentow, Foothill Ranch, CA (US)

(73) Assignee: LendAmend LLC, Los Angeles, CA (US)

(*) Notice: Subject to any disclaimer, the term of this patent is extended or adjusted under 35 U.S.C. 154(b) by 0 days.

(21) Appl. No.: 13/494,002

(22) Filed: Jun. 11, 2012

Related U.S. Application Data (60) Provisional application No. 61/495,920, filed on Jun. 10, 2011.

(51) Int. Cl.
G06Q 40/00 (2012.01)
G06Q 10/00 (2012.01)

(52) U.S. Cl.
USPC ............................................. 705/35; 705/344

(58) Field of Classification Search
None
See application file for complete search history.

(56) References Cited

U.S. PATENT DOCUMENTS 6,898,636 B1 * 5/2005 Adams et al. ................. 709/229

OTHER PUBLICATIONS

"Mantas and IBM Offer Joint Solution to Help Detect and Address Mutual Fund Abuses; Companies to Promote Comprehensive Compliance Solutions for Financial Markets", Feb. 7, 2004, www.buisinesswire.com.*

* cited by examiner

Primary Examiner — Charles Kyle
Assistant Examiner — Irene Kang
(74) Attorney, Agent, or Firm — Lance M. Pritikin (57) ABSTRACT

A system and method are provided for facilitating the amending of syndicated loans. Authorized users are registered in connection with their respective funds invested in the loan. Fund registration data is received for each fund and includes the fund holding amount and whether the fund is of the single or dual signature type. Authorized users may vote supporting, opposing or conditional with regard to the proposed amendment. A calculation is performed to anticipate the voting outcome before the amendment deadline. If the amendment is anticipated to pass, the conditional votes are converted to supporting votes. Typical embodiments provide for an Internet-enabled interface through which authorized users may enter or change their vote while monitoring the real-time status of the amendment. Agents may be automatically provided fund consents for each fund ending up with a supporting vote in a passing amendment. Funds may be automatically notified of the consent fee earned.

50 Claims, 3 Drawing Sheets

FIG. 1

PRESENTED FOR EXAMPLE ONLY

ONLINE VOTING WITH SECURITY PIN

| Fund Name | | Fund Holding** | Vote Yes | Vote Yes If Passing | Vote No | Confirm Vote | Potential Fee |
|---|---|---|---|---|---|---|---|
| Fund Master LP | View signature | 2,000,000.00 | ◉ Yes<br>Voted by you | ○ Yes if Passing | ○ No | | $5,000.00 |
| Fund Cap 3 | View signature | 500,000.00 | ◉ Yes<br>Voted by you | ○ Yes if Passing | ○ No | | $1,250.00 |
| Fund Cap 2 | View signature | 1,000,000.00 | ◉ Yes<br>Voted by you | ○ Yes if Passing | ○ No | | $2,500.00 |
| Fund Cap 1 | View signature | 500,000.00 | ◉ Yes<br>Voted by you | ○ Yes if Passing | ○ No | | $1,250.00 |
| Fund Capital CLO A | View signature | 1,000,000.00 | ◉ Yes<br>Voted by you | ○ Yes if Passing | ○ No | | $2,500.00 |
| Fund 2 | View signature | 1,000,000.00 | ◉ Yes<br>Voted by you | ○ Yes if Passing | ○ No | | $2,500.00 |
| Aggregate Holdings | | $6,000,000.00 | | | | | $15,000.00 |

Note: Funds voted "Yes" may not be subsequently changed. Funds voted "Yes if Passing" or "No" can be changed by Registered Users.
* The Fund deadline is 30 minutes before the deadline established by the Agent
** Please only input and vote Funds for which you directly control the investment.

☐ By checking this box you are affirming that you will comply with the User Agreement and if you change your vote, you will update your vote through this company.

PIN # for Signing:   (Forgot your PIN? Please click here)
****

[ Vote ]

SYSTEM AND METHOD FOR FACILITATING THE AMENDING OF SYNDICATED LOANS

RELATED APPLICATIONS

This application claims the benefit of U.S. Provisional Application No. 61/495,920, filed on Jun. 10, 2011 the content of which is incorporated by this reference in its entirety for all purposes as if fully set forth herein.

TECHNICAL FIELD

The present invention relates generally to methods for facilitating the amending of syndicated loans and similar types of credit agreements. More particularly, the invention concerns a system and method for access and use by co-lenders to facilitate the process of voting on acceptance of proposed loan amendments.

BACKGROUND

In the past, corporate bank lending was typically arranged based on a personal relationship between a bank (the lender) and its borrower. However, since the mid-1990s, the growing sophistication of financial engineering and the rise of private equity, leveraged buy-outs and general merger & acquisition activity led to increased use of debt in corporate transactions and in turn larger loans. With larger loans came the need to syndicate these large loans so that no one lender was assuming all the risk should a borrower default on the loan. Also contributing to the rapid growth in syndicated lending was the introduction of non-bank lenders, including hedge funds, mutual funds and CLOs—specialized investment vehicles whose sole purpose is to invest in syndicated loans. As a result, loan syndicates can be a diverse and fragmented group of investors, with the original underwriter carrying little if any risk exposure to the borrower.

Many large corporations have a need to borrow large sums of money for working capital, to purchase capital equipment, to acquire a competitor or to finance management buyouts (MBO). One way to raise this capital is through loans from a bank. Some loans are too large for one single bank to handle—especially when the company is seeking to assume significant indebtedness in which case the bank will ask other lenders to step in as co-lenders. Over the past 20 years, this market for co-lender loans—or leveraged loans—has grown dramatically. Today, approximately 300 financial institutions are active participants domestically in the leveraged bank loan market. The majority of these institutions are professional money management firms, not banks. The structure of these professional money management firms, also known as institutional lenders, is different from banks. For example, they have different regulatory requirements and often manage more than one asset class. Examples of other asset classes include stocks, bonds, insurance, real estate, and commodities. It is the bank loans asset class which is our initial focus, but because they handle many other asset classes as well, the compliance regime is complex. Furthermore, because these institutional lenders act as money managers for their clients, they oftentimes have complicated legal structures; some institutional lenders manage money via more than 50 different legal entities, all or only a subset of which may be co-lenders to the same bank loan. The growth and complexity of these non-bank institutional lenders makes the administration of modifications to credit agreements cumbersome.

Syndicated bank loans typically have maturity dates of 5-7 years and are governed by credit agreements containing restrictive covenants which the borrower must adhere to for the protection of the lenders. A borrower may require a modification of the terms of the credit agreement, otherwise known as an amendment, because its circumstances have changed, either as a result of changes in the economic climate or the competitiveness of the industry in which it competes, or simply because of growth. Historical data shows that 25-30% of all credit agreements are modified prior to maturity for these reasons. Most amendments to a credit agreement can be effectuated with the consent of Required Lenders (typically a majority of the syndicate of lenders). When credit agreements are changed, the risk parameters lenders originally bargained for are changed, often to become less restrictive for the borrower, which in turn increases the risk profile for lenders in the syndicate. Although credit agreement modifications impact (and typically increase) the credit risk profiles of all lenders in the syndicate, only those lenders who consent to the changes proposed by borrowers are paid a consent fee in exchange for agreeing to the new credit agreement terms, which if approved are imposed on all lenders in the syndicate.

Because syndicated loans are held by a wide group of lenders, many lenders view their individual vote as having little significance in determining whether an amendment will be accepted. In addition, they recognize that if an amendment does pass, those lenders who choose not to consent will not receive the consent fee but will still assume the same risks as the consenting lenders. As a consequence a lender may vote to accept an amendment it might otherwise view as presenting an unacceptable risk-reward profile in order to secure the consent fee. This is most pronounced in widely held loans, where lenders conventionally lack the transparency to know whether a request has the support of other lenders Without greater transparency and dissemination of vote count information, lenders will frequently make sub-optimal voting decisions instead of bargaining for an appropriately structured amendment with a risk profile they can support.

Conventionally, consenting signature pages to amendment requests are executed manually by the individual lenders and then delivered to the borrower (utilizing bank agent's counsel) via fax, email of a scanned copy, hand-delivery, or overnight courier. This is an operationally inefficient and time-consuming method of delivery. For example, conventionally, lenders who may hold up to 50 sub-funds may typically have to execute up to 50 sets of unique signature pages—one set for each sub-fund. This creates administrative problems for lenders and is very time-consuming.

Bank loan investors often receive Material Non-Public Information (MNPI) from the borrowers to assist them in better evaluating the risks of the loans they are granting. However, anyone in possession of MNPI may be in violation of US securities laws if they also trade in the stocks or other public securities of those same companies while in possession of such information. As a result, institutional lenders who manage a collection of stock portfolios, bond portfolios and bank loan portfolios have to carefully manage their handling of MNPI to avoid any insider trading allegations. Bank loan amendments, including potentially the knowledge that an amendment is proposed, pose a series of risks associated with the dissemination of MNPI which could cause problems unless handled with appropriate safe-guards.

The receipt of amendment consent fees are generally unscheduled payments. The accountants and back-office personnel who track cash receipts typically do not know the timing nor correct amount of consent fees to expect and thus cannot tie the consent fee receipts unless notified. Because they do not have checks and balances in place to detect errors in the amount of consent fee received, they are inclined to simply accept the amount posted. Such errors may go undetected, potentially costing institutional lenders significant incremental fees, and at the very least require significant additional in-house and outside accounting professionals resource due to this absence of systems that provide the appropriate access to information.

SUMMARY

By way of general summary, systems and methods in accordance with the present invention may receive user registration data and fund level data, generate and display a real-time vote tally with respect to specific proposed loan amendments, offer lenders a Conditional voting option in addition to the conventional Yes and No voting options that will enable lenders to better manage and assess the risks and rewards of a proposed amendment, provide lenders who approve a proposed loan amendment the ability to automate the execution and electronic delivery of their signature pages or other form of consent to the agent or other intermediary (e.g., a central voting clearing house), and facilitate appropriate communication between lenders while maintaining regulatory compliance and confidentiality. The Electronic Signature Act of 2001 may be complied with by way of embodiments which require signed voting pages and create an electronic personal identification number (PIN).

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views.

With respect to preferred embodiments, registered users may vote funds by way of, for example, a website interface. An amendment deadline is typically set by the agent of the loan underwriter in consultation with the borrower and entered into a data storage element. Registered users may use a web interface to enter a "No" vote, a "Yes" Vote, or a "Yes If Passing" (otherwise referred to herein as "Conditional") vote for a particular fund connected to the respective loan. Each Yes vote entered results in the creation of a signature page for that fund. A copy of the signature page or alternative appropriate form of the fund's consent is typically sent immediately to the user and the agent in electronic format, such as a PDF. At the amendment deadline, a summary voting email notification is typically sent to all registered users who have funds involved in loans pertaining to the proposed amendment. The summary voting email generally indicates that the proposed amendment is anticipated to have either passed or failed, depending on the count at the amendment deadline. The agent typically would not be sent a summary voting email.

Most preferred embodiments feature a dual-signature functionality. Specifically, some funds require the form of consent to be provided by more than one authorized user for a consent to be validly tendered. Preferred embodiments may track this authorization rule and factor this in to determining whether the Fund has been voted or not, and if so, how this is in turn should be displayed on the voting page and also in the presentation of the amendment page or other form of consent for execution and delivery to the counterparty.

In preferred embodiments, a calculation deadline may be established which precedes the amendment deadline by a pre-selected amount of time, for example, 30 minutes. Once the calculation deadline is reached, a calculation may be performed, by way of, for example, a processor element, to determine or predict whether there are sufficient Yes votes to cause the proposed amendment to pass. If there are sufficient Yes votes to cause the amendment to pass, the Conditional votes may be converted to Yes votes, and corresponding signature pages may be immediately created and delivered to the respective user and agent. Copies of the user's signature pages may then be stored and made accessible by way of, for example, a user's "My Signatures" tab on a web page interface. In embodiments, after the calculation deadline, users may continue to change No votes and Conditional votes or add new funds subject to voting logic.

In preferred embodiments, if at the calculation deadline the voting logic determines or predicts that the proposed amendment will fail, the Conditional votes remain Conditional until other users change their votes to Yes, change the amounts held by funds they voted, or add funds affirmatively voted such that the amendment is newly determined or predicted to pass. If and when the amendment is newly determined or predicted to pass, all Conditional votes are converted to Yes votes, the dashboard (for example, a voting statistics indicator) is updated, and the signature pages or other accepted form of consent for each newly converted Yes vote may be automatically created and electronically sent to the respective user and agent. As before, each user's Yes signature page is stored and is accessible by way of a "My Signatures" tab on, for example, a web page interface. Also, a vote summary notification providing notification of a passing amendment may then be delivered, for example, by email or other electronic means, to all users registered in regard to the amendment. In certain embodiments, signature pages per se may not be created as a result of a Yes vote. In such embodiments, once a Yes vote occurs, an alternative form of electronic consent data may be electronically delivered to the agent instead of, for example, an image of a signature page.

In certain embodiments, particularly certain embodiments in which signature pages are created and electronically delivered, if the proposed amendment ultimately passes, hardcopies of all signature pages previously created and electronically delivered are also printed out and sent by overnight delivery to the agent.

To facilitate certain steps, procedures and processes discussed herein, embodiments may comprise one or more data storage elements, server elements, processor elements, firewalls, communication devices, and user interface elements. Depending on the particular embodiment, a data storage element may be, for example, one or more hard drives, recording media, mass storage devices, removable media, external storage devices, volatile memory, non-volatile memory, flash memory, magnetic storage media, optical storage media, robotic storage, databases, other conventional data storage means, a combination thereof, or the like. Depending on the particular embodiment, a server element may be, for example, one or more database servers, web servers, chat or instant messaging servers, mail servers, file servers, print servers, a combination thereof, or the like. Depending on the particular embodiment, a processor element may be, for example, CPUs, microprocessors, network processors, communications processors, front-end processors, a combination thereof, or the like. Depending on the particular embodiment, a user interface device may be, for example, a smart phone, a laptop computer, a desktop computer, a tablet computer, a combination thereof, or the like. Depending on the particular embodiment, a user interface may be, for example, a graphical user interface (GUI), web-based interface, web user interface (WUI), touchpad, touch screen, command line interface, direct manipulation interface, computer keyboard, computer mouse, a combination thereof, or the like.

Generally speaking, when a Registered User or Administrator uses, accesses or participates in an embodiment of the system or method, they may do so by way of, for example, a user interface device. Similarly, when a Registered User or Administrator views certain displays, inputs data, creates templates, makes selections, or the like as discussed herein in relation to certain embodiments, they may generally do so by way of, for example, a user interface element. Calculations, determinations, software and algorithm execution, logic operations, or other decision-making processes discussed herein which are not performed expressly and exclusively by a living person, may typically be performed by one or more processor elements. Data which is received by or sent from certain components or particular steps of embodiments of the system and method are typically stored in and retrieved from one or more data storage elements. One or more of the data storage elements are typically accessible by one or more of the processor elements. Two or more of the data storage elements may be interconnected or interconnectable in order to bolster system robustness by way of, for example, data backup processes, operational redundancy and the like. Embodiments may also include redundant and backup processor elements to further bolster the robustness of the system. Embodiments typically include one or more web servers to, for example, provide Registered Users the ability to access or input data in relation to one or more components or steps of the system and method. In particular, one or more of the web servers typically contains the updated web pages for accessibility by the Registered Users by way of, for example, the user's internet connection and user interface device.

In certain embodiments, an administrator may be employed as a component of the system or method. By way of one example, in the creation of an amendment site (i.e., the interface with which the registered users will interact to vote on and interact with one another concerning the proposed loan amendment), the administrator logs into the system's software application, clicks a "My Amendments" tab, and clicks "Create New Amendment," at which the point the administrator is taken to the system's add loan flow. The Administrator may then enter a unique CUSIP, or other loan ID, and loan name. CUSIP refers to the Committee on Uniform Security Identification Procedures, and more specifically refers to a 9-character alphanumeric code identifying any North American security for the purpose of facilitating clearing and settlement of trades. After clicking Save, the administrator is taken to the "Amendment Edit" tab. The administrator then enters an Amendment name, facility size (total dollar amount of the loan), voting due date and time (in Eastern Time), a fee percentage, threshold amount, agent company, amendment moderator email address, and agent email address. The administrator may then enter zero or more timeline events.

In certain preferred embodiments, the administrator determines whether the amendment is a complex or basic amendment, and if basic, clicks Save. The administrator then creates a vote template of the signature page using a template editor. To approve the amendment site, the administrator visits the "Pending Amendments" queue and clicks Approve on a respective amendment site. The administrator may also add zero or more existing funds, add a new fund, or add users to an amendment site. The administrator may, in certain cases, also be referred to as an "Admin User," or simply, "Admin." The person or persons acting in the role of Administrator in certain embodiments may be lenders or borrowers or their agents or employees of a third party service provider. It is also envisioned that in particular embodiments, the Administrator may be, or substantially be, an automated process rather than, for example, a living person.

Preferred embodiments typically include the step of registering users. During user registration, new unregistered users and registered users can be invited to specific amendments by way of, for example, an email sent by the Admin or other registered users connected to that amendment using, for example, an "Invite Function." In certain embodiments, users with the same domain in their email address may by assumed to belong to the same company. After an initial registration of a user, for all subsequent registering users with the same domain name as that user (either by invite or registration without invite) their "Registration" and "My Accounts" tab may show the company name prepopulated and non-editable. The newly-registering user needs to fill in (or "populate") all fields in order to complete the registration process. The user then receives an account confirmation email after registration is successfully completed.

In typical preferred embodiments, once the user registration has been completed, the user may affect the addition of new funds to their account. After new funds have been entered and saved and dollar holdings added to existing funds, a user may be deemed to have "Accepted" participation in the amendment. As such, they should be added to the Contact List and begin receiving Forum and Document Upload email communications from the system at the direction of, for example, the Admin. Users are generally not added to the Contact List or receive amendment-specific communications until they have accepted an amendment.

In particular preferred embodiments, after new funds have been saved at the direction of the user, the user is directed to the Signature Upload page, where they are required to upload their signature in PDF format. After the system receives the uploaded signature, the user can crop the signature by way of a Cropping function. After the signature has been saved, the user is directed to a "PIN Selection" page, where the user's selected PIN can be entered and saved. An email may be sent to the user confirming the PIN selection. Other embodiments may simply require the user to provide his PIN and other information required for access and consent submission electronically to a third party such as the agent or a clearinghouse.

In certain preferred embodiments, the user is shown a confidentiality Splash page (or splash screen) requiring them to verify their acceptance of the terms of confidentiality the first time they enter an amendment (whether through clicking on an amendment or entering through the voting or $ holding functions). The Splash page is generally only shown one time per amendment visit and repeats anytime a user exits an amendment (for example, to go to "My Profile" tab) and then tries to re-enter an amendment.

For users who confirm account via email but do not complete the initial set-up (creation of funds and signature upload, and PIN setting), a link may appear on their My Amendment page stating, for example, "To complete your initial account setup, please click the following button. [Finish Setup]." Then the user would typically be directed back to the creating funds step followed by signature upload and PIN selection.

In certain preferred embodiments, with regard to user update functionality, from a My Profile tab, a user should be able to change: Account Password (popup confirmation), Email Address, Signature (popup and email confirmation), and Esignature PIN (popup and email confirmation).

In certain preferred embodiments, with regard to possible communications features, On the Registration and My Profile page, User's setting should be saved and updated for changes to the following elements: Receive daily email summary of Blogs, Receive Instant Messages, Email Alert for Amendment Updates, and Email Alert for Changes to Loan data. Users should receive communications per their established communications settings.

In particular preferred embodiment, a user should be able to Add Affiliation to Existing Funds (those already saved by his colleagues at the same company/domain name). Once doing so, that Existing Fund will be visible in a User's list of funds. In certain embodiments, the Admin should have ability to add Agent, Borrower and Advisor details to Contact List. In particular embodiments, the MySignaturePages tab should have a download all feature.

Certain funds may have affiliated users. In certain embodiments, each Fund can only be counted for purposes of the vote count 1 time (no matter how many affiliated Users there are or have voted for the fund). The current Vote Status of a fund should be visible to ALL users who are affiliated with that Fund (for example, if the fund has been voted Yes by one User—all affiliated Users will see the locked Yes vote for that Fund). For single signature funds, Affiliated Users who have voting authority (i.e., have uploaded their signature) may change the vote status of a Fund at all times until the fund has been Voted Yes by a User (at which point the vote is final and is un-editable). In embodiments, the popup display after submitting votes with a PIN should only say which funds that are being submitted (i.e. newly voted funds, newly changed vote funds). In particular embodiments, there should be no popup display for a fund that already has been voted Yes, or where the vote is not changing. In such cases, only the final signatory to a Fund with multiple Affiliates should receive an email with Yes PDF signature pages. All Affiliated Users for a fund should have an archive of any delivered Yes PDF signature pages (regardless of who the signatory was).

Embodiments of the present method and system may include a web-hosted software program, and were developed to solve the transparency, execution and compliance dilemmas faced by lenders in syndicated loans and investors in corporate bonds alike. Lenders in syndicated loans and investors in corporate bonds may be referred to herein as "registered users." Embodiments of the methods presented are configured to optimize the speed, ease-of-use, and reliability of the execution and delivery of consenting signature pages to amendment requests or consent solicitations.

Embodiments typically include a centralized electronic consent system (eg electronic signature page delivery system), through which lenders can execute their consent (e.g., unique signature pages) electronically, manage their compliance problems and utilize real-time voting transparency to evaluate and negotiate acceptable risk/reward trade-offs.

Registered users of the method and system disclosed herein benefit from the operational efficiencies created by substituting the operationally inefficient and time-consuming manual delivery process with an electronic consent signature page creation and automatic consent signature page delivery. A standardized process allows lenders to deliver and store their signature pages as well as creating instant and automatic audit trails which can be relied upon for verification of fee receipts. By centralizing the delivery of consenting signature pages, the administrator of the method and system can aggregate registration and consent data to provide lenders real-time information with respect to how other lenders intend to vote, as well as keeping a tally on the number of consents that have been delivered through the system. This transparency is valuable to lenders as they decide whether to consent to a proposal or to determine whether they have the ability to negotiate for improved amendment terms. Lenders generally have no other convenient means to access real-time information about consent signature page deliveries.

In addition to providing a display of real-time voting transparency to registered users, the method and system typically features an additional voting option. Conventionally, lenders have two voting option, "yes" or "no." Generally, the lender can either consent to an amendment by voting yes, or they can oppose an amendment by not submitting a consent form. As previously discussed, when a lender refrains from submitting their consent form, they become ineligible for receiving the consent fee offered to consenting lenders. Preferred embodiments of the method and system herein typically provide for a third voting option, which may be referred to as "Yes if Passing." The Yes if Passing option is a Conditional vote, which means that a voter's final vote is determined by the voting decisions of other participants or registered users.

This Conditional vote is governed by a rules-based algorithm to address and solve the transparency dilemma which may otherwise be faced by registered users. Registered users who elect to vote "Yes if Passing" are expressing that they do not agree to the proposed amendment terms, but that they want to submit their consenting signature pages if the amendment has the support of other lenders in the syndicate so that they will also receive the consent fee offered to consenting lenders. The Yes if Passing vote category is valuable introduction to the traditional process and allows participants to optimize their economic performance.

The voting transparency provided by certain embodiments of the system and method affords registered users reliable voting transparency, and allows lenders to deliver their consents electronically and automatically in the event their individual vote does not matter because the required lenders have already consented to the amendment request. If, on the other hand, required lenders have not consented to the agreement, then individual lenders can continue to bargain for what they individually believe to be an acceptable covenant modification, knowing that their consent will be automatically submitted via embodiments of the present method and system at the time the required lenders have agreed to the amendment terms.

The integration of data analysis, commands and functionalities of certain preferred embodiments are described in more detail in the Modules and Specifications segment below.

In the typical conventional process of amending loan agreements, the borrower recognizes its need for a credit agreement modification and contacts the credit agreement agent (typically the original underwriter) who in turn contacts the syndicate of lenders. The borrower will ask the agent to facilitate getting the amendment request consents from Required Lenders (typically 50.1% of the value of the loan balance outstanding). In return for getting the amendment request approved, the agent will receive a special success fee from the borrower. To incentivize individual lenders to support the amendment request the borrower will offer a consent fee paid only to consenting lenders and only if the amendment receives Required Lenders support and becomes effective. Lenders typically have between 24 hours and two weeks to decide if they will consent to the amendment. The decision of what to vote hinges on independent reviews of the amendment request as well as an assessment about the likelihood that the proposal will fetch support from other lenders. The larger lenders will often require a legal review of the amendment documents, while resource constrained smaller lenders may rely on their own reviews and/or discussions with other lenders to evaluate the impacts of the amendment request.

To better evaluate whether an amendment request is likely to garner the support of other lenders, many lenders in the US today attempt to contact other individual lenders (of the approximately 300 institutional lenders in the US market) to ascertain who among their co-lenders are also involved and what they are disposed toward the amendment. This ad hoc intelligence gathering is very time-consuming, is rarely reliable and poses significant compliance problems upon the interacting parties as some of them may possess Material Non-Public Information, while other lenders may not. Furthermore, to obtain reliable information lenders will have to disclose to others how they intend to vote, thereby compromising their privacy. In the end, these time-consuming efforts are neither reliable nor dynamic, as lenders may often change their minds as they bargain for terms, making it virtually impossible to keep an accurate tally on the aggregate vote count. Relying on other lenders' point-in-time representation about voting intentions is a risky proposition for a lender who desires to make its own voting decisions based on this information. If other lenders are dishonest about their intentions or change their mind, then the lender who relies on this information to cast its own vote could potentially be financially harmed. In preferred embodiments, the Conditional voting business logic and binding user agreement build accountability into a process that does not rely on any stated intentions and does not require any Registered User to disclose to anyone its voting intentions. Instead the present invention relies on actual votes cast on the system and is updated and displayed in real-time.

A "Yes if Passing" Conditional vote option is a unique feature which is not available to lenders today. Creating a Yes if Passing category and its associated business logic is groundbreaking in that it changes the way lenders can behave. Instead of submitting a consent signature page to an inferior proposal simply to protect receiving a fee, lenders can now continue to negotiate for better terms while knowing that if Required Lenders support the amendment, their signature page(s) will be submitted on their behalf automatically such that they will receive the consent fee.

Certain preferred embodiments require all users of the platform to be subject to a binding User Agreement. One key provision of the User Agreement may be that users agree to only submit signature pages through the system in accordance with the present invention for amendments in which they have expressed a vote to the system. This obligation on lenders helps ensure vote count integrity and provides the accountability amongst lenders that is lacking in the absence of preferred embodiments of the invention. The binding requirement to submit consents (e.g., signature pages) through a preferred embodiment of the system helps ensure that lenders can rely on the indicated vote status of their lending peers from other institutions.

Centralized electronic vote submission is generally not available to lenders today. Signature pages are not standardized and the system provided in preferred embodiments of the invention offers a flexible software module that allows for instant customization of lender consent data and voting information to enable electronic consent (e.g., signature page) submission. In the case of consents executed via signature pages, the use of customized electronic signature page submission saves lenders time as they can submit an unlimited amount of signature pages with the click of a single button, rather than downloading, printing, filling-out, signing, scanning, emailing and storing multiple consent signature pages.

A data interface "Dashboard" may be provided to display real-time amendment data to users. Through the Dashboard may be displayed the amendment timeline, the current status of the amendment (including a projection as to whether it is passing or not passing), registration data including the amount and percentage of the credit facility that is registered, Required Lenders amount, as well as the breakdown of all votes submitted and the amount of undecided votes and unregistered votes. Generally speaking, lenders currently do not have access to real-time amendment vote count data and will benefit significantly from this information.

Integrated communication tools available in certain embodiments facilitate direct and group based communication between Registered Users. This eliminates the need to search for lenders, they all come together in one place, and the filters and monitoring capabilities of embodiments of the system allow lenders to protect lenders from misappropriating the use of Material Non-Public Information. Such embodiments allow Lenders to benefit from discussing the potential impacts, anticipated or unanticipated, of a proposed amendment request, including leveraging the legal reviews commissioned by some of the larger lenders. Integrating voting and communications into a single online portal allows for significant synergies to the lender process of evaluating the risks and merits of loan amendment requests.

What follows is a discussion of the level of documentation and details preferred in particular embodiments. This discussion is not intended to be limiting, but rather to present examples of details and documentation for possible use and inclusion in connection with various embodiments.

Data Fields may include an amendment deadline and consent fee offered. The fields may be pulled from the amendment registration. A Fund Name data field may pull data from profiles for all Funds associated with the Member. A Fund Holding data filed may pull holding data from the Member profile for all Funds associated with the Member. Holding data may be edited/changed on this page. An alert message may be sent to those who have opted to receive them (see Communication preferences).

Voting choices may be selected, for example, using radio buttons. In typical preferred embodiments, a Member can only select one choice per Fund (i.e., selections being mutually exclusive). If indicating Yes or Yes If Passing, the Member may also be prompted to enter his self-designated password PIN (or equivalent personal identifier) and agree to the terms of a user agreement. In certain preferred embodiments, the e-signature PIN must match the e-signature PIN of the Member. All selections may require the Member to click Submit Vote button to effectuate the selection.

If no PIN is entered for a Member who selects Yes or Yes If Passing, then clicking the Submit button will produce the PIN Required popup window, which instructs the Member to enter his PIN. This presents the following options: 1) submit an e-signature and register for a PIN (if that has not already been done); 2) invite an authorized co-worker to enter his PIN (the SignorContact page); and 3) to retrieve/reset the PIN if it has been forgotten. Users can retrieve their password if forgotten using the forgot password link. A validly entered and accepted vote may be stored by Fund in a Vote data table.

Upon completion of a vote, a confirmation email may be sent to all users affiliated with the voted Funds who have selected to receive confirmation emails. See also Vote Submission process described below.

A Review Signature Page link may be provided to allow Members to review the consent signature page for each fund that is voted YES or YES IF PASSING and edit if necessary. Certain preferred embodiments may provide a Voted By function which may indicate which signor voted each fund such that colleagues will know who voted funds they are affiliated with. For example, if a fund has already been voted by a colleague the funds voting choice may be highlighted on the voting page along with the name of signor who voted the fund.

Dual signature funds are funds where the manager has requested that it takes two signors to complete a vote. In certain preferred embodiments, when the first signor designates his vote and completes the PIN this election will be evident at any time a colleague affiliated with the fund accesses the Voting Module. A second signatory is required to complete the execution of the consent signature page, which may be done, for example, by clicking a radio button in a Confirm Vote row (the confirm row may only be visible for dual signature funds). After confirming the vote, the second signatory is typically required to input his personal PIN code to execute his signature, which will be placed on the dual signature consent page.

In certain embodiments, an Add/Edit funds link may be provided to take members to their profile page where they can add or edit funds. A Consent Fee field may calculate the total fee offered by Fund and total. Such Consent Fee may be calculated by multiplying the Holding for each Fund by the amendment fee percentage associated with the Amendment. A Total may be present which represents the sum of individual fund fees.

Creating Consent Signature Page Module. In certain embodiments, the Administrator creates and uploads the Amendment Schema for each specific amendment such that each unique consent signature page conforms to the consent form in the underlying credit agreement. A flexible consent form module allows the Administrator to designate all fields required on the credit agreement consent form and associate those fields with data fields captured in the each signors signature profile and each funds voting data. In certain embodiments, each signor must have an electronic copy of a signature on file with an operator or implementer of the method or system described herein, the electronic copy of the signature being stored in the signor signature database. Signatures may be uploaded by the signor during the registration process and are protected by a unique password for each signor.

Submitting Consent Signature Page Module. Consent forms may be emailed immediately and automatically to the user as well as to agent's counsel or as directed under the amendment request. For each fund validly voted YES, the consent signature page may be completed (or "created") using the fund information and the user information contained in the user profile (including the Esignature on file) for each unique fund and each unique signor. Completed consent signature pages are converted into a PDF format and are stored in the users profile for future reference. Simultaneously, the PDF copy of the consent signature page may be emailed to the user and the agent's counsel or as directed.

In embodiments, YES (Supporting) Votes may be treated according to the process above. YES votes may be registered and counted for purposes of the Dashboard and voting indications. In particular preferred embodiments, YES votes are permanent and cannot be changed to YES IF PASSING (Conditional) or NO votes by users.

In embodiments, NO (Opposing) Votes are registered as opposing the amendment proposal and the aggregate NO and YES IF PASSING (Conditional) votes may be compared against the Required Lenders amount in determining whether an amendment is likely to pass. NO votes may also be registered and counted for purposes of the Dashboard and voting indications. In preferred embodiments, a NO vote is not converted into a PDF file and nothing is sent to the user or agent's counsel. A NO vote is typically treated as inaction. However, in preferred embodiments, a NO vote can be changed to a YES IF PASSING or a YES vote at any time by a signor (or two signors in the case of dual signatures).

In particular embodiments, YES IF PASSING (or "Conditional") Votes are registered as opposing the amendment proposal and the aggregate NO and YES IF PASSING votes are compared against the Required Lenders amount in determining whether an amendment is likely to pass. YES IF PASSING votes may also be registered and counted for purposes of the Dashboard and voting indications. In preferred embodiments, a YES IF PASSING (Conditional) vote is not converted into a PDF file and nothing is sent to the user or agent's counsel. A YES IF PASSING vote may be treated as NO vote until the Calculation Deadline at which point a calculation will be performed by a processor element to determine whether YES IF PASSING votes should be converted to YES votes automatically or remain YES IF PASSING votes. YES IF PASSING votes can be changed to a NO or a YES vote at any time by a signor (or two signors in the case of dual signatures). If, according to the Calculation Deadline calculations (described below), YES IF PASSING votes are converted to YES votes, then all YES IF PASSING votes will be sent simultaneously.

In certain preferred embodiments, a Calculation Deadline is the time specified or selected by one involved in the implementation of the method and system, and is typically selected to be 30 minutes prior to the actual amendment deadline. On the Calculation Deadline, the system will calculate, for example, by way of a processor element, the sum of the NO percentage and YES IF PASSING percentage and compare that total percentage to One (1) minus the Required Lenders percentage (typically 50.1%). If the aggregate of NO and YES IF PASSING percentage is greater than One (1) minus the Required Lenders percentage then the amendment request will not pass and YES IF PASSING votes will remain YES IF PASSING votes. If the aggregate of NO and YES IF PASSING percentage is less than One (1) minus the Required Lenders percentage then the amendment request is likely to pass YES IF PASSING votes will convert to YES votes and automatically submitted as described above.

In particular preferred embodiments, if at any time after the Calculation Deadline a new vote is submitted or a holding amount is changed or any other change is made to the voting data, the system, by way of, for example, a processor element, will instantly recalculate the Calculation Deadline calculation which may result in YES IF PASSING votes being converted to YES votes.

Amendment Specific Data Summary. Dashboard is the data display page for each specific amendment. The present system and method is adapted to aggregating and displaying real-time voting data for users. The enhanced transparency provided by the Dashboard is designed to help lenders better evaluate the likelihood of an amendment passing and is thus highly value-added and actionable information for lenders as they decide whether to consent to an amendment request and thereby agree to modify the protective covenants they bargained for when the loan was granted, should instead choose to allocate resources to negotiate for terms which are more acceptable to that individual lender.

On embodiments of the Dashboard page, Timeline may contain all major milestones for the specific proposed amendment. Voting Indication is a running calculation identical to the Calculation Deadline calculation which is used to identify whether registered lenders oppose or support the amendment proposal. Registration Count illustrates graphically and numerically the total size of the credit facility, the holding amount of registered users, the percentage of the credit facility that is registered, and the Required Lenders Amount. Voting Status illustrates graphically and numerically the range of votes cast by registered members: YES, NO, and YES IF PASSING as well as undecided (e.g., lenders who have registered but have not yet cast a vote) and unregistered lenders (e.g., lenders in the credit facility who have yet to register with regard to the method or system).

Particular embodiments make available to users an integrated Communication Module which has been designed to facilitate individual and group communications using message boards, chat functions, document postings and an automatically generated contact list. The ability of lenders to communicate directly and securely serves to save time and expedite the decision making process for the individual lender. Certain lenders may not have the resources or feel comfortable evaluating or responding to an amendment proposal without prior consultation with other lenders.

Secure Communication is vital to lenders and investors. Individual lenders may have differing information privileges, where some lenders have access to Material Non-Public Information ("MNPI") while others may rely entirely on publicly available information. Preferred embodiments of the method and system require each user who uses the Communication Module to declare whether he is allowed to receive MNPI or not. Lenders who declare that they cannot receive MNPI are subject to filters that block all documents and posting containing MNPI. This is particularly helpful for diverse investor groups such as syndicated loan investors and high yield bond investor groups. The MNPI filters are flexible and can be applied to individual users, such that certain users from the same firm may be able to view all information, while others may be kept shielded from MNPI.

Contact Lists is a data display developed to facilitate information within the Communication Module as well as outside. Identifying users in each amendment allows users to better evaluate information posted to message boards or private chats. Furthermore, it helps lenders who wish to call each other directly for more in-depth conversations. Contact Lists may be generated by pulling data from registered lender's profiles and display Organization, Name, Phone Number, Email Address and when applicable the total Holding Amount of his organization.

A method for facilitating the amending of loan terms may comprise, for example, one or more steps as described below.

Figure 1:
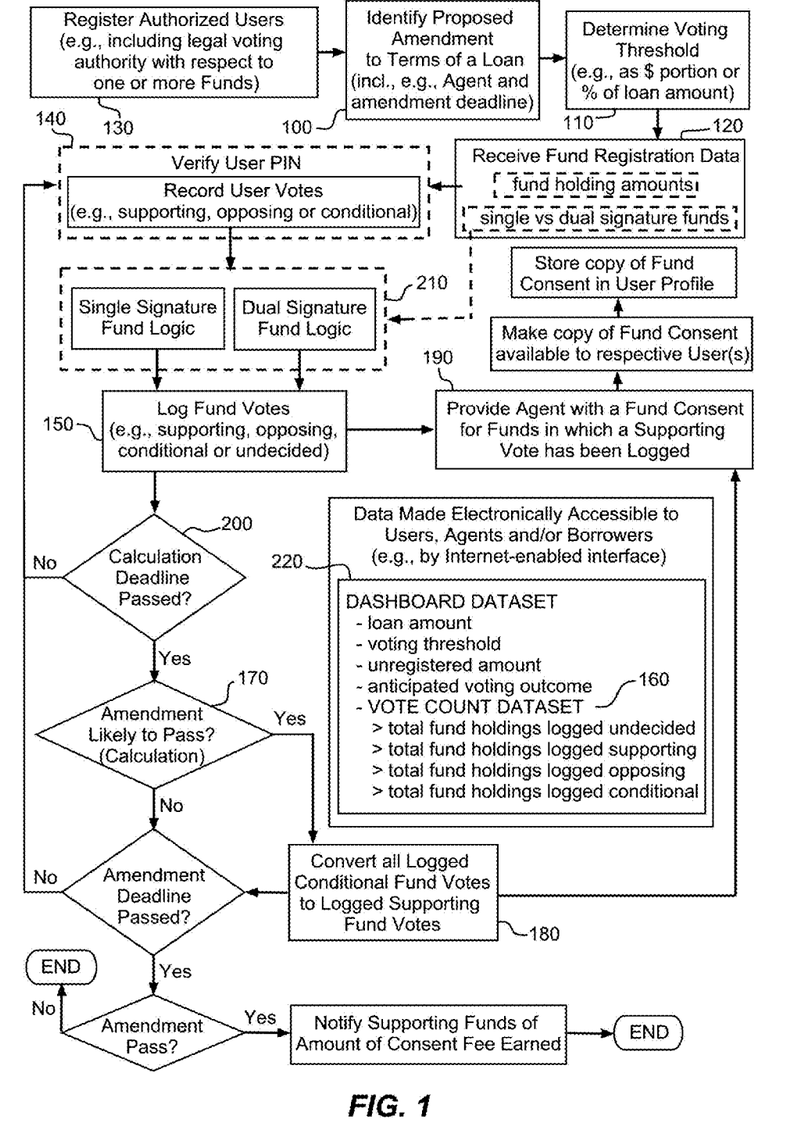
FIG. 1 is a diagrammatic logic flowchart depiction of an embodiment of a method in accordance with the present invention.
Figure 2:
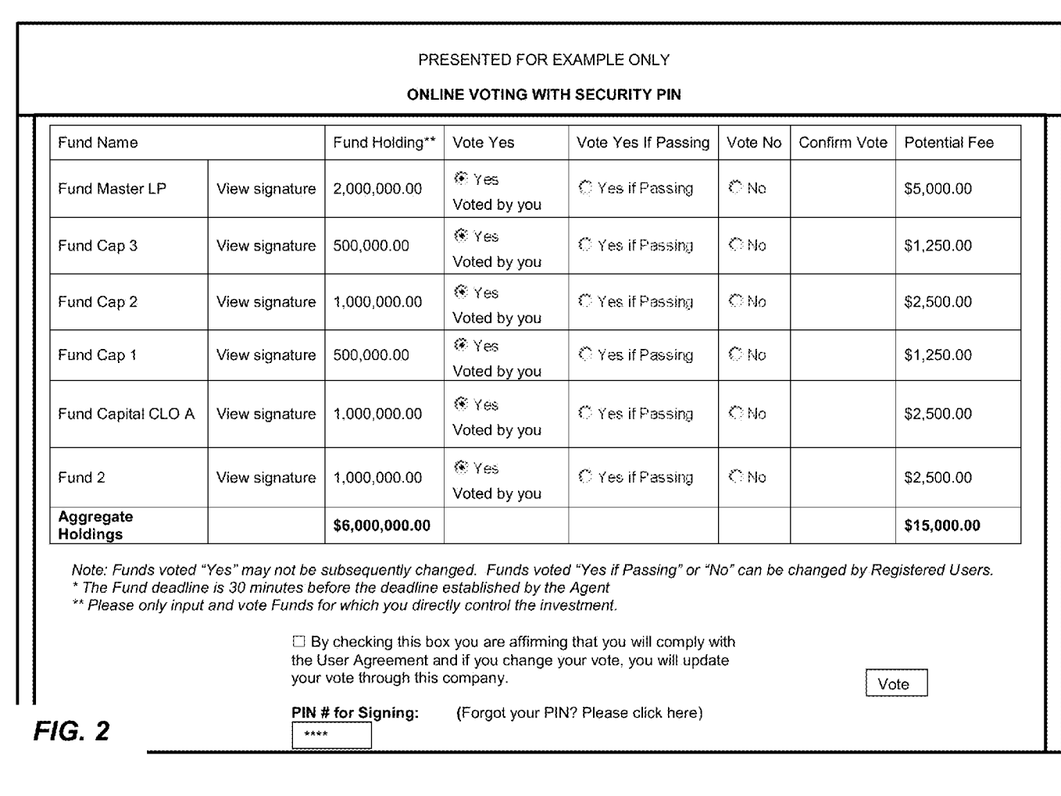
FIG. 2 is a diagrammatic screen shot of an example voting page of an Internet-enabled interface by which an authorized user may enter user votes to be recorded.

FIG. 1 illustrates one or more preferred embodiments of a method in accordance with the present invention. In step 100, a proposed amendment to terms of a loan may be identified and pertinent data recorded. The loan may have a loan amount, at least one borrower and a multiplicity of lenders. The multiplicity of lenders may have respective funds invested in the loan. The proposed amendment typically has an agent and an amendment deadline. In certain embodiments, even once the voting has begun, the initially-selected amendment deadline may be pushed out by, for example, the borrower or agent, before it is actually reached.

As illustrated by step 110, a voting threshold may be determined. The voting threshold is the threshold required to be met in order to approve the proposed amendment. It is typically expressed, for example, in the same units as, or as a percentage of, the loan amount. For example, the voting threshold may be set at 51%, or greater than 50%, of the loan amount.

In step 120, fund registration data may be received for one or more of the funds. Fund registration data may include, for example, a fund name or identifier, and the respective fund holding amount. The fund holding amount for each respective fund is typically the amount invested in the loan by the respective fund;

In step 130, a plurality of authorized users may be registering, for example, in machine readable memory. Authorized users may be, for example, those having legal voting authority for one or more loans registered in connection with embodiments of this method. Importantly, authorized users who previously registered in association with the funds relevant to the proposed amendment typically do not need to be registered each time a new amendment is proposed and voted on. Rather, when used in particular embodiments in connection with a new proposed amendment, it is the fund holding amount of each respective fund that typically needs to be entered, as opposed to re-registering the users already associated with those funds.

As illustrated by step 140, a user vote may be recorded, preferably in machine readable memory for example, from one or more of the authorized users with regard to a respective fund. Authorized users may preferably enter their vote through an Internet-enabled interface. However, it is understood that in particular embodiments, additional or alternative means may be provided to allow a user to enter their user vote where, for example, sufficient authentication is presented in accordance with applicable securities regulations. In certain preferred embodiments of this step, each user vote is either supporting, opposing or conditional.

Referring to step 150, a fund vote may be logged, preferably in machine readable memory for example, a fund vote for each of a multiplicity of the funds for which fund registration data is received. In a typical preferred embodiment of the method, the fund vote logged for each respective fund may be supporting, opposing, conditional (i.e., "yes if passing") or undecided with respect to the proposed amendment. A fund vote may be logged by way of software logic based upon user votes which have been recorded in connection with the respective fund. However, in particular embodiments, a fund vote may also be logged as opposite or undecided, for example, by virtue of no user vote having yet been recorded in connection with the respective fund.

Referring to step 160, a vote count dataset may be made electronically accessible to at least a subset of the registered authorized users. The vote count dataset may include one or more of the following: (i) the total of fund holding amounts corresponding to funds for which an undecided fund vote has been logged; (ii) the total of fund holding amounts corresponding to funds for which a supporting fund vote has been logged; (iii) the total of fund holding amounts corresponding to funds for which an opposing fund vote has been logged; and (iv) the total of fund holding amounts corresponding to funds for which a conditional vote has been logged;

Referring to step 170, an anticipated voting outcome for the proposed amendment may be calculated by way of, for example, a processor element programmed with a calculation logic. The calculation may be based upon at least the loan amount, the voting threshold, and the fund holding amounts corresponding to logged fund votes. The calculation is typically adapted to result in an indication as to whether the proposed amendment is likely to pass or likely not to pass.

Referring to step 180, all logged conditional fund votes may be converted to logged supporting fund votes if the step of calculating 170 results in an indication that the proposed amendment is likely to pass.

Referring to step 200, in particular embodiments, a calculation deadline may be selected to be, for example, at or within one day prior to the amendment deadline. In such embodiments, the step of converting 180 may be configured to occur no earlier than the calculation deadline. In certain preferred embodiments, after the calculation deadline, the steps of calculating 170 and converting 180 are performed for each time a fund vote is logged, a logged fund vote is changed to supporting, or a fund holding amount is changed. In particular preferred embodiments, the calculation deadline may be configured to precede the amendment deadline by one hour or less.

In step 190, the agent may be provided a fund consent for each fund having a logged supporting fund vote with regard to the proposed amendment.

Particular embodiments of a method may further comprise the step of preliminarily assessing the anticipated voting outcome for the proposed amendment. This step is preferably performed by a processor element for each time a fund vote is logged, for example, prior to the step of calculating. Similar to the step of calculating 170, this preliminary assessment is typically based upon at least the loan amount, the voting threshold, and the fund holding amounts corresponding to logged fund votes. Similar to the step of calculating 170, this step typically results in an indication as to whether the proposed amendment is likely to pass or likely not to pass. In preferred embodiments, this indication is electronically accessible to at least a subset of the registered authorized users. In certain embodiments, the indication is made electronically accessible to the entire group of authorized users who have legal voting authority with respect to funds invented in the respective loan. In further embodiments, borrowers and/or agents may have such access.

Particular preferred embodiments may comprise the step of updating the vote count dataset, by a processor element for example, for each time a fund vote is logged or converted. In preferred such embodiments, the vote count dataset may be updated substantially at the time a fund vote is logged or converted. For example, the update may occur within a few seconds or minutes of the logged or converted fund vote, thus providing other respective users, borrowers or agents essentially real-time access to the vote status. In certain embodiments, the agent may be defined at least in part as an intermediary between the multiplicity of lenders and the at least one borrower.

In particular preferred embodiments, the fund registration data for each fund includes whether the respective fund is a single signature fund or a dual signature fund. As illustrated in step 210, for each single signature fund, single signature fund voting logic is applied in which a supporting fund vote is logged only if (i) at least one supporting user vote is recorded in connection with the respective fund, or (ii) at least one conditional user vote is recorded in connection with the respective fund and the step of calculating results in an indication that the proposed amendment is likely to pass. Whereas for each dual signature loan, dual signature fund voting logic is applied in which a supporting fund vote is logged only if (i) at least two supporting user votes are recorded in connection with the respective fund, or (ii) at least two either supporting or conditional user votes are recorded in connection with the respective fund and the step of calculating results in an indication that the proposed amendment is likely to pass.

As illustrated, for example, within box 140, certain embodiments of a method may further comprise the step of verifying a personal identification number received from at least one of the authorized users prior to recording a user vote from the respective authorized user.

The processor element used for performing the step of calculating 170 may be programmed with variations in the conditional voting logic. For example, in particular embodiments of systems and methods in accordance with present invention, the voting threshold is expressed in the same units as the loan amount, and the step of calculating 170 results in an indication that the proposed amendment is likely to pass if the fund holding amounts that correspond to the logged opposing fund votes and logged conditional fund votes total less than the loan amount minus the voting threshold.

In certain alternative embodiments of systems and methods in accordance with present invention, the voting threshold is expressed as a percentage of the loan amount, and the step of calculating 170 results in an indication that the proposed amendment is likely to pass if the fund holding amounts that correspond to logged opposing fund votes and logged conditional fund votes total less than the loan amount times a difference between 100% and the voting threshold.

In yet other alternative embodiments, the voting threshold is expressed in the same units as the loan amount, and the step of calculating 170 results in an indication that the proposed amendment is likely to pass if the fund holding amounts that correspond to logged opposing fund votes and logged conditional fund votes total less than or equal to the loan amount minus the voting threshold.

In another alternative embodiment, the voting threshold is expressed as a percentage of the loan amount, and the step of calculating results in an indication that the proposed amendment is likely to pass if the fund holding amounts that correspond to logged opposing fund votes and logged conditional fund votes total less than or equal to the loan amount times a difference between 100% and the voting threshold.

In further alternative embodiments, the voting threshold is expressed in the same units as the loan amount; an unregistered amount is defined by the loan amount minus the fund holding amounts that correspond to all logged fund votes; and the step of calculating 170 results in an indication that the proposed amendment is likely to pass if the fund holding amounts that correspond to logged supporting and undecided fund votes and the unregistered amount total greater than or equal to the voting threshold.

In other alternative embodiments, the voting threshold is expressed as a percentage of the loan amount; an unregistered amount is defined by the loan amount minus the fund holding amounts that correspond to logged fund votes; and the step of calculating 170 results in an indication that the proposed amendment is likely to pass if the fund holding amounts that correspond to logged supporting and undecided fund votes and the unregistered amount total greater than or equal to the loan amount times the voting threshold.

In yet further alternative embodiments, the voting threshold is expressed in the same units as the loan amount, and the step of calculating results in (i) an indication that the proposed amendment is likely to pass if the fund holding amounts that correspond to the logged opposing votes and logged conditional votes total less than the loan amount minus the voting threshold; and (ii) an indication that the proposed amendment is likely not to pass if the fund holding amounts that correspond to the logged opposing votes and logged conditional votes total more than the loan amount minus the voting threshold.

In additional alternative embodiments, the voting threshold is expressed as a percentage of the loan amount, and the step of calculating results in (i) an indication that the proposed amendment is likely to pass if the fund holding amounts that correspond to the logged opposing votes and logged conditional votes total less than the loan amount times the difference between 100% and the voting threshold; and (ii) an indication that the proposed amendment is likely not to pass if the fund holding amounts that correspond to the logged opposing votes and logged conditional votes total more than the loan amount times the difference between 100% and the voting threshold.

Figure 3:
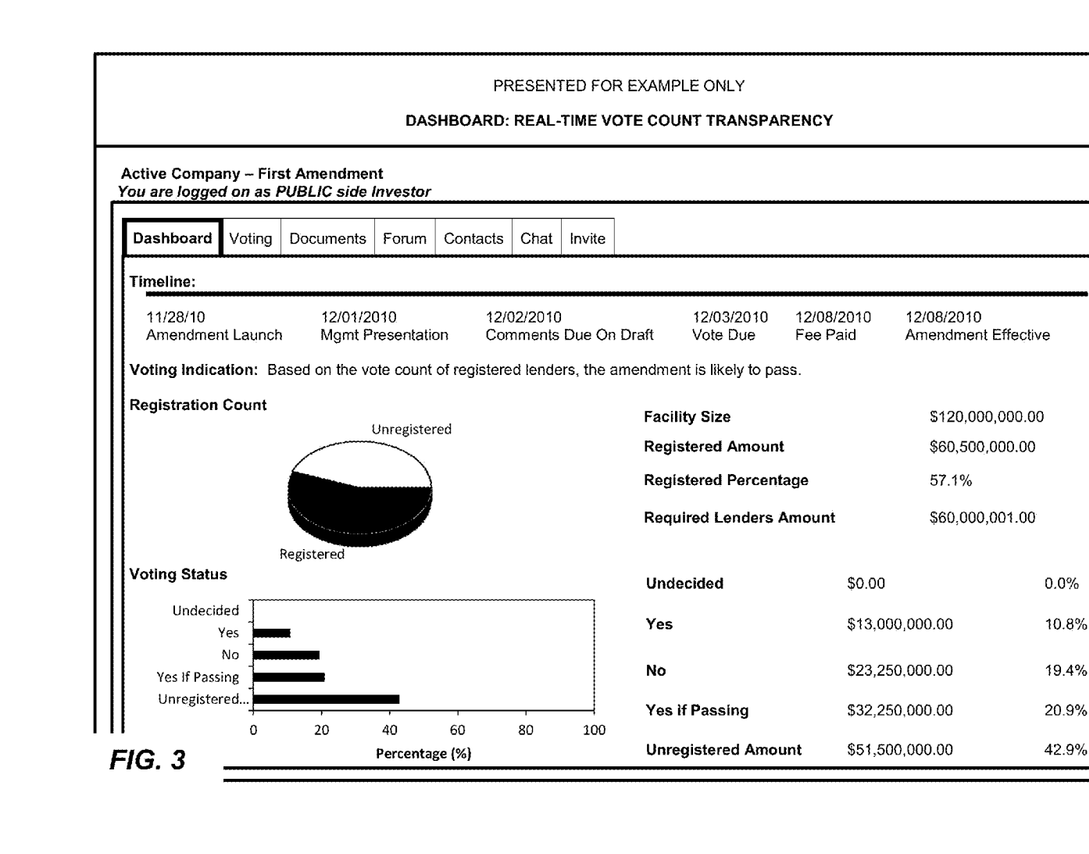
FIG. 3 is a diagrammatic screen shot of an example dashboard dataset page of an Internet-enabled interface.

Referring to 220 for example, certain preferred embodiments of a system or method may make a dashboard dataset electronically accessible to at least a subset of registered authorized users. The dashboard dataset may include one or more of: (i) the loan amount, (ii) the voting threshold, wherein the voting threshold is expressed in the same units as the loan amount, (iii) the vote count dataset, (iv) an unregistered amount defined by the loan amount minus the fund holding amounts that correspond to all logged fund votes, and (v) the indication as to whether the proposed amendment is likely to pass or likely not to pass. In certain preferred embodiments, the dashboard dataset may be revised for each time a fund vote is logged or converted. In preferred such embodiments, the dashboard dataset may be updated substantially at the time a fund vote is logged or converted. For example, the update may occur within a few seconds or minutes of the logged or converted fund vote, thus providing other respective users, borrowers or agents essentially real-time access to the vote status and overall status and data relating to the proposed amendment.

In particular preferred embodiments, the loan has a credit agreement, the credit agreement has a consent form, and the fund consents each conform to the consent form. In certain embodiments, the agent is either an administrative agent of the loan or a counsel of an administrative agent of the loan. Further, in particular embodiments, the fund consents are provided to the agent at least in electronic form, such as by email or downloadable file.

Certain embodiments may further comprise the step of computing a potential consent fee for each fund. The potential consent fee may be an amount payable to the respective fund if the respective fund is associated with a logged supporting fund vote and the proposed amendment is ultimately approved. Such embodiments may further comprise the step of sending an electronic notification to at least one registered authorized user associated with each fund for which a consent fee is payable, the electronic notification specifying the respective amount payable.

Embodiments of a system for facilitating the amending of loan terms may comprise machine readable memory, a processor element, and one or more logic applications. The machine-readable memory may be configured for storage of loan data, amendment data, fund registration data, authorized user data, user vote data and fund vote data as described elsewhere herein in various embodiments. The processor element may be configured to communicate with the machine-readable memory. The one or more logic applications may be executable by the processor element and may contain instructions which, when executed by the processor element, configure processor element to, for example, generate a vote count dataset, perform a step of calculating 170, perform a step of converting 180. A vote count dataset 160, examples of which have been discussed, may be electronically accessible, for example, via Internet-enabled interface, to authorized users, borrowers and/or agents associated with the loan.

For a step of calculating 170, the processor element may be configured to calculate an anticipated voting outcome for the proposed amendment (i) based upon at least the loan amount, the voting threshold, and the fund holding amounts corresponding to logged fund votes, and (ii) may preferably result in an indication as to whether the proposed amendment is likely to pass or likely not to pass. For a step of converting 180, the processor element may configured to convert all logged conditional fund votes to logged supporting fund votes if the step of calculating 170 results in an indication that the proposed amendment is likely to pass. A system generally also comprises a means for providing the agent a fund consent for each fund having a logged supporting fund vote with regard to the proposed amendment. Such means may be, for example, an email, downloadable file or the like.

Certain embodiments of a system may include an Internet-enabled interface. In such embodiments, each user vote may be received by way of the Internet-enabled interface for the recording of the user vote in, for example, the machine-readable memory. In such embodiments, the electronic accessibility to the vote count dataset and dashboard dataset may also be by way of the Internet-enabled interface.

In particular preferred embodiments of a system, the processor element may be further configured to revise the dashboard dataset for each time a fund vote is logged or converted. The dashboard dataset may be updated substantially at the time a fund vote is logged or converted. For example, the update may occur within a few seconds or minutes of the logged or converted fund vote, thus providing other respective users, borrowers or agents essentially real-time access to the vote status and overall status and data relating to the proposed amendment.

In certain embodiments of a system, the processor element may be further configured to preliminarily assess the anticipated voting outcome for the proposed amendment, examples of such preliminary assessment have been described.

In embodiments of a system, the machine-readable memory may be further configured for storage of a calculation deadline selected to be at or within one day prior to the amendment deadline. In such a system, the processor element may be configured to perform the step of converting no earlier than the calculation deadline.

In particular embodiments of a system, the processor element may be further configured to perform the steps of calculating and converting, as otherwise described herein. The processor element may also further be configured to update the vote count dataset for each time a fund vote is logged or converted.

In certain preferred embodiments of a system, the processor element may be further configured to ensure that the appropriate voting logic is applied for single signature funds and dual signature funds, examples of such logic having been described. The processor element may further be configured to verify a personal identification number or equivalent, such as biometric or alpha-numeric identifier, received from at least one of the authorized users prior to a user vote being recorded from the respective authorized user.

In particular embodiments, the processor element may be further configured to compute a potential consent fee for each fund. The potential consent fee may be an amount payable to the respective fund if the respective fund is associated with a logged supporting fund vote and the proposed amendment is approved. Moreover, a system may further comprise a means for sending an electronic notification to at least one registered authorized user associated with each fund for which a consent fee is payable, the electronic notification specifying the respective amount payable. Such means may include, for example, email or Internet-enabled interface (e.g., a webpage). In certain embodiments, a copy of a fund consent may be made available to a respective user, and a further copy may be stored in the user's profile and viewable or retrievable by way of an Internet-enabled interface. Embodiments may also provide a copy of each fund consent to the investment management company (or equivalent entity) which employs a respective authorized user. This may allow such company to easily receive and store such fund consents in the aggregate in order to more quickly satisfy certain compliance obligations.

A processor element as described herein may be comprised of, for example, one or more computer processors. Similarly, the machine-readable memory discussed herein may be comprised of one or more data storage devices.

The foregoing detailed description of the invention is intended to be illustrative and is not intended to limit the scope of the invention. Changes and modifications are possible with respect to the embodiments detailed in the foregoing descriptions, and it is understood that the invention may be practiced otherwise than that specifically described herein and still be within the scope of the appended claims.

What is claimed is:

1. A method for facilitating the amending of loan terms, the method comprising the steps of:
    identifying a proposed amendment to terms of a loan, the loan having a loan amount, at least one borrower and a multiplicity of lenders, the multiplicity of lenders having respective funds invested in the loan, the proposed amendment having an agent and an amendment deadline;
    determining a voting threshold required to approve the proposed amendment, the voting threshold being expressed in the same units as, or as a percentage of, the loan amount;
    receiving fund registration data for one or more of the funds, the fund registration data for each fund including a respective fund holding amount, the fund holding amount for each respective fund being an amount invested in the loan by the respective fund;
    registering, in machine readable memory, a plurality of authorized users;
    recording, in machine readable memory, a user vote from one or more of the authorized users with regard to a respective fund, wherein each user vote is at least supporting, opposing or conditional;
    logging, in machine readable memory, a fund vote for each of a multiplicity of the funds for which fund registration data is received, wherein the fund vote for each respective fund is supporting, opposing, conditional or undecided with respect to the proposed amendment;
    making a vote count dataset electronically accessible to at least a subset of the registered authorized users, the vote count dataset including one or more of:
        (i) the total of fund holding amounts corresponding to funds for which an undecided fund vote has been logged,
        (ii) the total of fund holding amounts corresponding to funds for which a supporting fund vote has been logged,
        (iii) the total of fund holding amounts corresponding to funds for which an opposing fund vote has been logged, and
        (iv) the total of fund holding amounts corresponding to funds for which a conditional vote has been logged; and
    calculating, by a processor element, an anticipated voting outcome for the proposed amendment, wherein the step of calculating
        (i) is based upon at least the loan amount, the voting threshold, and the fund holding amounts corresponding to logged fund votes, and
        (ii) results in an indication as to whether the proposed amendment is likely to pass or likely not to pass;
    converting all logged conditional fund votes to logged supporting fund votes if the step of calculating results in an indication that the proposed amendment is likely to pass; and
    providing the agent a fund consent for each fund having a logged supporting fund vote with regard to the proposed amendment.

2. A method as defined in claim 1 further comprising the step of:
    preliminarily assessing, by the processor element, the anticipated voting outcome for the proposed amendment, wherein the step of preliminarily assessing
        (i) is performed for each time a fund vote is logged prior to the step of calculating,
        (ii) is based upon at least the loan amount, the voting threshold, and the fund holding amounts corresponding to logged fund votes, and
        (iii) results in an indication as to whether the proposed amendment is likely to pass or likely not to pass, the indication being electronically accessible to at least a subset of the registered authorized users.

3. A method as defined in claim 1 further comprising the step of
    selecting a calculation deadline to be at or within one day prior to the amendment deadline, wherein the step of converting occurs no earlier than the calculation deadline.

4. A method as defined in claim 3 wherein, after the calculation deadline:
    the steps of calculating and converting are performed for each time
        (i) a fund vote is logged,
        (ii) a logged fund vote is changed to supporting, or
        (iii) a fund holding amount is changed.

5. A method as defined in claim 3 wherein the calculation deadline precedes the amendment deadline by one hour or less.

6. A method as defined in claim 1 further comprising the step of:
    updating the vote count dataset for each time a fund vote is logged or converted.

7. A method as defined in claim 1 wherein the agent is defined at least in part as an intermediary between the multiplicity of lenders and the at least one borrower.

8. A method as defined in claim 1 wherein the fund registration data for each fund includes whether the respective fund is a single signature fund or a dual signature fund.

9. A method as defined in claim 8 wherein
    for each single signature fund, a supporting fund vote is logged only if
        (i) at least one supporting user vote is recorded in connection with the respective fund, or
        (ii) at least one conditional user vote is recorded in connection with the respective fund and the step of calculating results in an indication that the proposed amendment is likely to pass; and for each dual signature fund, a supporting fund vote is logged only if
  (i) at least two supporting user votes are recorded in connection with the respective fund, or
  (ii) at least two either supporting or conditional user votes are recorded in connection with the respective fund and the step of calculating results in an indication that the proposed amendment is likely to pass.

10. A method as defined in claim 1 further comprising the step of:
verifying a personal identification number received from at least one of the authorized users prior to recording a user vote from the respective authorized user.

11. A method as defined in claim 1 wherein
the voting threshold is expressed in the same units as the loan amount; and
the step of calculating results in an indication that the proposed amendment is likely to pass if the fund holding amounts that correspond to the logged opposing fund votes and logged conditional fund votes total less than the loan amount minus the voting threshold.

12. A method as defined in claim 1 wherein
the voting threshold is expressed as a percentage of the loan amount; and
the step of calculating results in an indication that the proposed amendment is likely to pass if the fund holding amounts that correspond to logged opposing fund votes and logged conditional fund votes total less than the loan amount times a difference between 100% and the voting threshold.

13. A method as defined in claim 1 wherein
the voting threshold is expressed in the same units as the loan amount; and
the step of calculating results in an indication that the proposed amendment is likely to pass if the fund holding amounts that correspond to logged opposing fund votes and logged conditional fund votes total less than or equal to the loan amount minus the voting threshold.

14. A method as defined in claim 1 wherein
the voting threshold is expressed as a percentage of the loan amount; and
the step of calculating results in an indication that the proposed amendment is likely to pass if the fund holding amounts that correspond to logged opposing fund votes and logged conditional fund votes total less than or equal to the loan amount times a difference between 100% and the voting threshold.

15. A method as defined in claim 1 wherein
the voting threshold is expressed in the same units as the loan amount;
an unregistered amount is defined by the loan amount minus the fund holding amounts that correspond to all logged fund votes; and
the step of calculating results in an indication that the proposed amendment is likely to pass if the fund holding amounts that correspond to logged supporting and undecided fund votes and the unregistered amount total greater than or equal to the voting threshold.

16. A method as defined in claim 1 wherein
the voting threshold is expressed as a percentage of the loan amount;
an unregistered amount is defined by the loan amount minus the fund holding amounts that correspond to logged fund votes; and
the step of calculating results in an indication that the proposed amendment is likely to pass if the fund holding amounts that correspond to logged supporting and undecided fund votes and the unregistered amount total greater than or equal to the loan amount times the voting threshold.

17. A method as defined in claim 1 wherein
the voting threshold is expressed in the same units as the loan amount; and
the step of calculating results in
  (i) an indication that the proposed amendment is likely to pass if the fund holding amounts that correspond to the logged opposing votes and logged conditional votes total less than the loan amount minus the voting threshold; and
  (ii) an indication that the proposed amendment is likely not to pass if the fund holding amounts that correspond to the logged opposing votes and logged conditional votes total more than the loan amount minus the voting threshold.

18. A method as defined in claim 1 wherein
the voting threshold is expressed as a percentage of the loan amount; and
the step of calculating results in
  (i) an indication that the proposed amendment is likely to pass if the fund holding amounts that correspond to the logged opposing votes and logged conditional votes total less than the loan amount times the difference between 100% and the voting threshold; and
  (ii) an indication that the proposed amendment is likely not to pass if the fund holding amounts that correspond to the logged opposing votes and logged conditional votes total more than the loan amount times the difference between 100% and the voting threshold.

19. A method as defined in claim 1 further comprising the steps of:
making a dashboard dataset electronically accessible to at least the subset of registered authorized users, the dashboard dataset including one or more of:
  (i) the loan amount,
  (ii) the voting threshold, wherein the voting threshold is expressed in the same units as the loan amount,
  (iii) the vote count dataset,
  (iv) an unregistered amount defined by the loan amount minus the fund holding amounts that correspond to all logged fund votes, and
  (v) the indication as to whether the proposed amendment is likely to pass or likely not to pass; and
revising the dashboard dataset for each time a fund vote is logged or converted.

20. A method as defined in claim 1 wherein the loan has a credit agreement, the credit agreement has a consent form, and the fund consents each conform to the consent form.

21. A method as defined in claim 1 wherein the agent is either an administrative agent of the loan or a counsel of an administrative agent of the loan.

22. A method as defined in claim 1 wherein the fund consents are provided to the agent at least in electronic form.

23. A method as defined in claim 1 further comprising the step of:
computing a potential consent fee for each fund, the potential consent fee being an amount payable to the respective fund if the respective fund is associated with a logged supporting fund vote and the proposed amendment is approved.

24. A method as defined in claim 23 further comprising the step of:
sending an electronic notification to at least one registered authorized user associated with each fund for which a consent fee is payable, the electronic notification specifying the respective amount payable.

25. A system for facilitating the amending of loan terms, the system comprising:
- machine-readable memory configured for storage of loan data, amendment data, fund registration data, authorized user data, user vote data and fund vote data, wherein (i) the loan data includes a loan identifier, a loan amount, at least one borrower, a multiplicity of lenders having respective funds invested in the loan, and the funds invested in the loan (ii) the amendment data includes an amendment identifier for a proposed amendment, an agent of the proposed amendment, an amendment deadline and the voting threshold required to approve the proposed amendment, the voting threshold being expressed in the same units as, or as a percentage of, the loan amount;
- (iii) the fund registration data corresponds to one or more of the funds, the fund registration data for each respective fund including a respective fund holding amount, the fund holding amount for each respective fund being an amount invested in the loan by the respective fund;
- (iv) the authorized user data corresponds to a plurality of registered authorized users;
- (v) the user vote data includes a recorded user vote from one or more of the authorized users with regard to a respective fund, wherein each recorded user vote is at least supporting, opposing or conditional;
- (vi) the fund vote data includes a logged fund vote for each of a multiplicity of the funds, wherein the logged fund vote for each respective fund is supporting, opposing, conditional or undecided with respect to the proposed amendment;
- a processor element configured to communicate with the machine-readable memory;
- one or more logic applications executable by the processor element and containing instructions which, when executed by the processor element, configure processor element to:
- generate a vote count dataset;
- perform a step of calculating; and
- perform a step of converting;
- wherein the vote count dataset is electronically accessible to at least a subset of the registered authorized users and includes one or more of:
  - (i) the total of fund holding amounts corresponding to funds for which an undecided fund vote has been logged,
  - (ii) the total of fund holding amounts corresponding to funds for which a supporting fund vote has been logged,
  - (iii) the total of fund holding amounts corresponding to funds for which an opposing fund vote has been logged, and
  - (iv) the total of fund holding amounts corresponding to funds for which a conditional vote has been logged;
- wherein for the step of calculating, the processor element is configured to calculate an anticipated voting outcome for the proposed amendment (i) based upon at least the loan amount, the voting threshold, and the fund holding amounts corresponding to logged fund votes, and
- (ii) resulting in an indication as to whether the proposed amendment is likely to pass or likely not to pass; and
- wherein for the step of converting, the processor element is configured to convert all logged conditional fund votes to logged supporting fund votes if the step of calculating results in an indication that the proposed amendment is likely to pass.

26. A system as defined in claim 25 further comprising an Internet-enabled interface, each user vote being received by way of the Internet-enabled interface for the recording of the user vote in the machine-readable memory, and the electronic accessibility is by way of the Internet-enabled interface.

27. A system as defined in claim 25 further comprising an Internet-enabled interface by which a dashboard dataset is electronically accessible to at least the subset of registered authorized users, the dashboard dataset including one or more of:
- (i) the loan amount,
- (ii) the voting threshold, wherein the voting threshold is expressed in the same units as the loan amount,
- (iii) the vote count dataset,
- (iv) an unregistered amount defined by the loan amount minus the fund holding amounts that correspond to all logged fund votes, and
- (v) the indication as to whether the proposed amendment is likely to pass or likely not to pass.

28. A system as defined in claim 27 in which the processor element is further configured to revise the dashboard dataset for each time a fund vote is logged or converted.

29. A system as defined in claim 25 in which the processor element is further configured to preliminarily assess the anticipated voting outcome for the proposed amendment, wherein the preliminary assessment:
- (i) is performed for each time a fund vote is logged prior to the step of calculating,
- (ii) is based upon at least the loan amount, the voting threshold, and the fund holding amounts corresponding to logged fund votes, and
- (iii) results in an indication as to whether the proposed amendment is likely to pass or likely not to pass, the indication being electronically accessible to at least a subset of the registered authorized users.

30. A system as defined in claim 25 in which the machine-readable memory is further configured for storage of a calculation deadline selected to be at or within one day prior to the amendment deadline, and wherein processor element is configured to perform the step of converting no earlier than the calculation deadline.

31. A system as defined in claim 30 wherein the processor element is further configured to perform the steps of calculating and converting for each time, after the calculation deadline:
- a fund vote is logged,
- a logged fund vote is changed to supporting, or
- a fund holding amount is changed.

32. A system as defined in claim 31 wherein the calculation deadline precedes the amendment deadline by one hour or less.

33. A system as defined in claim 25 wherein the processor element is further configured to update the vote count dataset for each time a fund vote is logged or converted.

34. A system as defined in claim 25 wherein the fund registration data for each fund includes whether the respective fund is a single signature fund or a dual signature fund.

35. A system as defined in claim 34 wherein the processor element is further configured to ensure that:
- for each single signature fund, a supporting fund vote is logged only if
  - (i) at least one supporting user vote is recorded in connection with the respective fund, or
  - (ii) at least one conditional user vote is recorded in connection with the respective fund and the step of calculating results in an indication that the proposed amendment is likely to pass; and for each dual signature fund, a supporting fund vote is logged only if
(i) at least two supporting user votes are recorded in connection with the respective fund, or
(ii) at least two either supporting or conditional user votes are recorded in connection with the respective fund and the step of calculating results in an indication that the proposed amendment is likely to pass.

36. A system as defined in claim 25 in which the processor element is further configured to verify a personal identification number received from at least one of the authorized users prior to a user vote being recorded from the respective authorized user.

37. A system as defined in claim 25 wherein
the voting threshold is expressed in the same units as the loan amount; and
the step of calculating results in an indication that the proposed amendment is likely to pass if the fund holding amounts that correspond to the logged opposing fund votes and logged conditional fund votes total less than the loan amount minus the voting threshold.

38. A system as defined in claim 25 wherein
the voting threshold is expressed as a percentage of the loan amount; and
the step of calculating results in an indication that the proposed amendment is likely to pass if the fund holding amounts that correspond to logged opposing fund votes and logged conditional fund votes total less than the loan amount times a difference between 100% and the voting threshold.

39. A system as defined in claim 25 wherein
the voting threshold is expressed in the same units as the loan amount; and
the step of calculating results in an indication that the proposed amendment is likely to pass if the fund holding amounts that correspond to logged opposing fund votes and logged conditional fund votes total less than or equal to the loan amount minus the voting threshold.

40. A system as defined in claim 25 wherein
the voting threshold is expressed as a percentage of the loan amount; and
the step of calculating results in an indication that the proposed amendment is likely to pass if the fund holding amounts that correspond to logged opposing fund votes and logged conditional fund votes total less than or equal to the loan amount times a difference between 100% and the voting threshold.

41. A system as defined in claim 25 wherein
the voting threshold is expressed in the same units as the loan amount;
an unregistered amount is defined by the loan amount minus the fund holding amounts that correspond to all logged fund votes; and
the step of calculating results in an indication that the proposed amendment is likely to pass if the fund holding amounts that correspond to logged supporting and undecided fund votes and the unregistered amount total greater than or equal to the voting threshold.

42. A system as defined in claim 25 wherein
the voting threshold is expressed as a percentage of the loan amount;
an unregistered amount is defined by the loan amount minus the fund holding amounts that correspond to logged fund votes; and
the step of calculating results in an indication that the proposed amendment is likely to pass if the fund holding amounts that correspond to logged supporting and undecided fund votes and the unregistered amount total greater than or equal to the loan amount times the voting threshold.

43. A system as defined in claim 25 wherein
the voting threshold is expressed in the same units as the loan amount; and
the step of calculating results in
(i) an indication that the proposed amendment is likely to pass if the fund holding amounts that correspond to the logged opposing votes and logged conditional votes total less than the loan amount minus the voting threshold; and
(ii) an indication that the proposed amendment is likely not to pass if the fund holding amounts that correspond to the logged opposing votes and logged conditional votes total more than the loan amount minus the voting threshold.

44. A system as defined in claim 25 wherein
the voting threshold is expressed as a percentage of the loan amount; and
the step of calculating results in
(i) an indication that the proposed amendment is likely to pass if the fund holding amounts that correspond to the logged opposing votes and logged conditional votes total less than the loan amount times the difference between 100% and the voting threshold; and
(ii) an indication that the proposed amendment is likely not to pass if the fund holding amounts that correspond to the logged opposing votes and logged conditional votes total more than the loan amount times the difference between 100% and the voting threshold.

45. A system as defined in claim 25 wherein the loan has a credit agreement, the credit agreement has a consent form, and the fund consents each conform to the consent form.

46. A system as defined in claim 25 configured to provide the fund consents to the agent at least in electronic form.

47. A system as defined in claim 25 in which the processor element is further configured to compute a potential consent fee for each fund, the potential consent fee being an amount payable to the respective fund if the respective fund is associated with a logged supporting fund vote and the proposed amendment is approved.

48. A system as defined in claim 47 further comprising an email- or internet-enabled interface for sending an electronic notification to at least one registered authorized user associated with each fund for which a consent fee is payable, the electronic notification specifying the respective amount payable.

49. A system as defined in claim 25 wherein the processor element is comprised of a one or more computer processors and the machine-readable memory is comprised of one or more data storage devices.

50. A method for facilitating the amending of loan terms, the method comprising the steps of:
identifying a proposed amendment to terms of a loan, the loan having a loan amount, at least one borrower and a multiplicity of lenders, the multiplicity of lenders having respective funds invested in the loan, the proposed amendment having an agent and an amendment deadline;
determining a voting threshold required to approve the proposed amendment, the voting threshold being expressed in the same units as, or as a percentage of, the loan amount;
receiving fund registration data for one or more of the funds, the fund registration data for each fund including a respective fund holding amount and whether the respective fund is a single signature fund or a dual signature fund, the fund holding amount for each respective fund being an amount invested in the loan by the respective fund;

registering a plurality of authorized users;

recording a user vote from one or more of the authorized users with regard to a respective fund, wherein each user vote is at least supporting, opposing or conditional;

logging a fund vote for each of a multiplicity of the funds for which fund registration data is received, wherein the fund vote for each respective fund is supporting, opposing, conditional or undecided with respect to the proposed amendment;

making a vote count dataset electronically accessible to at least a subset of the registered authorized users, the vote count dataset including one or more of:

(i) the total of fund holding amounts corresponding to funds for which an undecided fund vote has been logged, (ii) the total of fund holding amounts corresponding to funds for which a supporting fund vote has been logged, (iii) the total of fund holding amounts corresponding to funds for which an opposing fund vote has been logged, and (iv) the total of fund holding amounts corresponding to funds for which a conditional vote has been logged;

calculating, by a processor element, an anticipated voting outcome for the proposed amendment, wherein the step of calculating (i) is based upon at least the loan amount, the voting threshold, and the fund holding amounts corresponding to logged fund votes, and (ii) results in an indication as to whether the proposed amendment is likely to pass or likely not to pass;

converting all logged conditional fund votes to logged supporting fund votes if the step of calculating results in an indication that the proposed amendment is likely to pass;

selecting a calculation deadline to be at or within one day prior to the amendment deadline, wherein the step of converting occurs no earlier than the calculation deadline;

updating the vote count dataset for each time a fund vote is logged or converted; and providing the agent a fund consent for each fund having a logged supporting fund vote with regard to the proposed amendment;

wherein for each single signature fund, a supporting fund vote is logged only if (i) at least one supporting user vote is recorded in connection with the respective fund, or (ii) at least one conditional user vote is recorded in connection with the respective fund and the step of calculating results in an indication that the proposed amendment is likely to pass; and wherein for each dual signature fund, a supporting fund vote is logged only if (i) at least two supporting user votes are recorded in connection with the respective fund, or (ii) at least two either supporting or conditional user votes are recorded in connection with the respective fund and the step of calculating results in an indication that the proposed amendment is likely to pass.

* * * * *